(12) United States Patent
Qiu et al.

(10) Patent No.: US 9,201,321 B2
(45) Date of Patent: *Dec. 1, 2015

(54) PROCESS FOR PREPARING POLYESTER EMULSIONS

(71) Applicant: XEROX CORPORATION, Norwalk, CT (US)

(72) Inventors: Shigang Steven Qiu, Toronto (CA); Chieh-Min Cheng, Rochester, NY (US); Amy Grillo, Rochester, NY (US); Yulin Wang, Oakville (CA); Rashid Mahmood, Mississauga (CA); David Kurceba, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 264 days.

This patent is subject to a terminal disclaimer.

(21) Appl. No.: 13/919,989

(22) Filed: Jun. 17, 2013

(65) Prior Publication Data

US 2014/0370438 A1     Dec. 18, 2014

(51) Int. Cl.
*C08J 3/09* (2006.01)
*G03G 9/08* (2006.01)
*G03G 9/093* (2006.01)
*C08G 63/00* (2006.01)
*G03G 9/087* (2006.01)

(52) U.S. Cl.
CPC .............. *G03G 9/0804* (2013.01); *C08G 63/00* (2013.01); *G03G 9/08755* (2013.01); *G03G 9/08795* (2013.01); *G03G 9/08797* (2013.01); *G03G 9/09328* (2013.01); *G03G 9/09392* (2013.01)

(58) Field of Classification Search
CPC ...................... G03G 91/0804; G03G 9/09392
USPC ..................................... 430/137.11; 523/339
See application file for complete search history.

(56) References Cited

U.S. PATENT DOCUMENTS

| | | |
|---|---|---|
| 3,590,000 A | 6/1971 | Palermiti |
| 3,800,588 A | 4/1974 | Larson |
| 4,298,672 A | 11/1981 | Lu |
| 4,338,390 A | 7/1982 | Lu |
| 5,290,654 A | 3/1994 | Sacripante |
| 5,302,486 A | 4/1994 | Patel |
| 6,063,827 A | 5/2000 | Sacripante |
| 6,214,507 B1 | 4/2001 | Sokol |
| 6,593,049 B1 | 7/2003 | Veregin |
| 6,756,176 B2 | 6/2004 | Stegamat |
| 6,830,860 B2 | 12/2004 | Sacripante |
| 2006/0222991 A1 | 10/2006 | Sacripante |
| 2010/0310979 A1* | 12/2010 | Ou et al. ................ 430/108.2 |

* cited by examiner

*Primary Examiner* — Hannah Pak
(74) *Attorney, Agent, or Firm* — Pillsbury Winthrop Shaw Pittman LLP (57) ABSTRACT

A phase inversion emulsification process includes dissolving a polyester resin in a mixture comprising (1) an organic solvent, (2) a first portion of a total amount of neutralizing agent, and (3) a first portion of water, neutralizing the dissolved polyester resin with a second portion of neutralizing agent, the second portion of neutralizing agent including the remaining amount of the total amount neutralizing agent, forming an emulsion by adding a second portion of water after the neutralizing step, and removing a portion of the organic solvent from the emulsion to provide a latex.

18 Claims, 3 Drawing Sheets

PROCESS FOR PREPARING POLYESTER EMULSIONS

BACKGROUND

The present disclosure relates to processes for producing polyester resin emulsions useful in preparing toner particles. More specifically, the present disclosure provides an improved phase inversion emulsification process.

The Phase Inversion Emulsification (PIE) process is a method whereby the phases of a liquid-solid dispersion interchange such that the dispersed phase spontaneously inverts to become the continuous phase and vice versa under conditions determined by the system properties, volume ratio and energy input.

The phase inversion process typically involves the solubilization of a resin and other components in an organic solvent or mixture of organic solvents that include a phase inversion organic solvent, which is typically chosen for its solubility in both organic and aqueous phases.

By way of example, a solvent-based phase inversion emulsification process is often used to form a polyester resin emulsion in the production of polyester-based toners. In the phase inversion emulsification process, the polyester resin is first dissolved in appropriate organic solvents, such as methyl ethyl ketone and isopropanol, to produce a homogenous organic phase, followed by addition of a fixed amount of base solution, such as ammonium hydroxide, to neutralize acid end carboxyl groups on the polyester chain. The neutralized polymer is subsequently converted to a uniform dispersion of polyester particles, or latex, in water by phase inversion.

The time required for dissolution of a polyester resin, in particular, can represent a bottleneck in the production cycle for the preparation of polyester emulsions. For example, complete dissolution may take from about 1.5 to about 2 hours for a typical acidic polyester resin. In order to reduce the production cycle time of the PIE process, it would be beneficial to expedite one or more steps in the phase inversion emulsification process, including reducing dissolution time. Reducing production time may be beneficial only provided that the production yield and the emulsion properties are not negatively impacted.

SUMMARY

In some aspects, embodiments disclosed herein relate to phase inversion emulsification processes comprising (a) dissolving a polyester resin in a mixture comprising (1) an organic solvent, (2) a first portion of a total amount of neutralizing agent, and (3) a first portion of water, (b) neutralizing the dissolved polyester resin with a second portion of neutralizing agent, the second portion of neutralizing agent comprising the remaining amount of the total amount neutralizing agent, (c) forming an emulsion by adding a second portion of water after the neutralizing step, and (d) removing a portion of the organic solvent from the emulsion to provide a latex.

In some aspects, embodiments disclosed herein relate to phase inversion emulsification processes comprising (a) dissolving an amorphous polyester resin in a mixture comprising (1) an organic solvent, (2) about one third of a total amount of neutralizing agent, and (3) a first portion of water, the first portion of water being insufficient to form an emulsion, (b) neutralizing the dissolved polyester resin with a second portion of neutralizing agent, the second portion of neutralizing agent comprising the remaining amount of the total amount neutralizing agent, (c) forming an emulsion by adding a second portion of water after the neutralizing step, and (d) removing a portion of the organic solvent from the emulsion to provide a latex.

BRIEF DESCRIPTION OF DRAWINGS

Various embodiments of the present disclosure will be described herein below with reference to the figures wherein.

DETAILED DESCRIPTION

In a standard phase inversion emulsification (PIE) process employing acidic polyester resins, the resin is first completely dissolved in organic solvents, such as methyl ethyl ketone and isopropanol, to produce a homogenous organic phase. Dissolution is followed by addition of a fixed amount of base, such as ammonium hydroxide, to neutralize acid end groups on the polyester chain, which are subsequently converted to a uniform dispersion of polyester particles in water through phase inversion. The acidic polyester may take from about 1.5 to about 2.0 hours to fully dissolve the polyester resins in the organic solvents.

The standard PIE process generally comprises four steps. The following exemplary description outlines this process for the emulsification of an amorphous polyester resin into latex:
(1) Dissolution of the resin at a certain temperature in the solvents (MEK and IPA);
(2) Neutralization of acid groups by adding an aqueous solution of base to the dissolved resin solution after step (1);
(3) Emulsification by adding preheated or room temperature de-ionized water (DIW) to the above mixture; and
(4) Removal of the solvents by a vacuum distillation step.

The mechanisms governing the dissolution step may be quite complex in the case of polymer resins. Without being bound by theory, it has been indicated that the dissolution of an amorphous polymer, in particular, into a solvent involves two transport processes, (1) solvent diffusion and (2) chain disentanglement. When an amorphous polymer is in contact with a thermodynamically compatible solvent, the solvent may diffuse into the polymer. A gel-like swollen layer may be formed along with two separate interfaces, one between the polymer and gel layer and the other between the gel layer and the solvent. Over time the polymer eventually dissolves.

It has been postulated that disentanglement may be a function of, at least in part, the polymer molecular weight. Higher molecular weights may necessitate higher levels of disentanglement, and at such higher molecular weights the polymers may need to undergo a higher degree of swelling before dissolution occurs. It has also been indicated that dissolution may be influenced by a polymers polydispersity. For example, a polydisperse polymer will generally dissolve about twice as fast as monodisperse polymer with the same molecular weight (Mn). Other factors that can influence the dissolution process may include chain chemistry, composition and stereochemistry. By way of example, the dissolution behavior of a polymer can be substantially affected by the tacticity of the polymer and such behavior may also correlate with the glass transition temperature ($T_g$).

Embodiments disclosed herein include the surprising discovery of a beneficial effect of partial neutralization of acidic polyester resins to accelerate the dissolution step as part of the PIE process. The dissolution time of a polyester resin in solvents may be reduced from the existing about 1.5 to about 2.0 hours to about 0.5 hour. Thus, the processes disclosed herein may improve the overall emulsion productivity by reducing the process cycle time. As evidenced in the Examples below, this reduction in process cycle time was achieved without negative impacts to the polyester emulsion properties.

In accordance with embodiments disclosed herein, the new PIE process accelerates dissolution by combining partial neutralization of acidic residues on the polyester resin. Thus, in some embodiments, there are provided phase inversion emulsification processes comprising dissolving at least one polyester resin in a mixture comprising (1) an organic solvent, (2) a first portion of a total amount of neutralizing agent, and (3) a first portion of water, neutralizing the dissolved at least one polyester resin with a second portion of neutralizing agent, wherein the second portion of neutralizing agent comprises the remaining amount of the total amount neutralizing agent, forming an emulsion by adding a second portion of water after the neutralizing step, and removing a portion of the organic solvent from the emulsion to provide a latex.

As used herein, "a total amount of neutralizing agent" refers to a stoichiometric amount of neutralizing agent sufficient to neutralize all the theoretical acidic groups on the polymer resin.

As used herein, "a first portion" and "a second portion," when used in conjunction with the amount of neutralizing agent or amount of water, refers to non-zero fractional amounts of a total amount of neutralizing agent or water employed in the PIE process. By way of example, expressed at percentages, a first portion a neutralizing agent may therefore include about 0.1% to about 99.9%, including any value in between and fractions thereof. Similarly, a corresponding second portion of neutralizing agent would be the complementary amount of neutralizing agent or about 99.9% to about 0.1%, including any value in between and fractions thereof. In some embodiments, the first portion of neutralizing agent may comprise about one third of the total amount of neutralizing agent. In some embodiments, the first portion of water may comprise about one fourth to about one third of a total amount of water required to form an emulsion. In some embodiments, the first portion of neutralizing agent may be dissolved in the first portion of water. In some such embodiments, the exact amount of the first portion of water may be only the minimum amount required to solubilize the neutralizing agent. In other embodiments, the first portion of water may be present in excess of what is needed to solubilize the first portion of neutralizing agent. The exact amount of the first portion of water may be selected to reduce the time required for the downstream emulsification step. The exact amount of the first portion of water may also be a maximum amount without causing premature formation of an emulsion.

The following 4 step sequence serves as an example of a PIE process in accordance with embodiments disclosed herein:

(1) Neutralization of acid groups employing about ⅓ (about 33.3%) of the base relative to a total amount of base needed for complete neutralization and about ¼ to about ⅓ (about 25% to about 33.3%) water at a certain temperature in solvents (such as MEK and IPA) to effect dissolution of the resin;

(2) Neutralization of acid groups by adding the remaining ⅔ (about 66.7%) to the dissolved polymer after step (1);

(3) Emulsification by adding a preheated or room temperature amount of remaining water, i.e. about 66.7% to about 75.0% of the total amount required to form an emulsion to the neutralized polymer from step (2); and (4) Removal of the solvents by, for example, a vacuum distillation step.

Without being bound by theory, in step (1) of this example, a certain amount of water (⅓~¼) is employed to provide a ready source of hydroxide ions ($OH^-$) with the addition of the base. By means of the selected water-miscible solvents (IPA) as a carrier, the hydroxide ions ($OH^-$) may attack and neutralize the carboxyl end groups of the polyester resin, which forms the negative carboxylate ion at the end of the polymer chain. Additionally, due to the split partial water added in step (1), the remaining water is added in the third step over a period of 60 minutes instead of 90 minutes used in the standard PIE process. Thus, the emulsification step is also shortened by the PIE processes described herein.

Acidic polyester resins comprise carboxylic acid end groups on the polymer chain. In some embodiments, some polymers may also have carboxyl groups disposed on side chains. Again, without being bound by theory, it has been postulated that the neutralization of carboxyl groups on the polymer chains generate carboxylate ions, which may speed up the polymer chain disentanglement. As a result, a more rapid dissolution takes place. Because polymer resin particle size can also affect the dissolution rate under certain mixing conditions, combining the process disclosed herein with fine resin particle size, such as 1 mm Pass, the dissolution time can be reduced even further.

Table 1 below compares the times associated with the PIE process disclosed herein with the times associated with a standard PIE process.

TABLE 1

Comparison of two PIE process

| Step | PIE Process | PIE Formulation | Process time (min) |
|---|---|---|---|
| 1 | Dissolution & Neutralization | Resin, solvents, first portion base, first portion water | 32 |
| 2 | Neutralization | Balance of base to effect neutralization | 2 |
| 3 | Emulsification | Balance of water to effect emulsion formation | 60 |
| 4 | Distillation | | |

| Step | Standard PIE Process | Standard PIE Formulation | Process time (min) |
|---|---|---|---|
| 1 | Dissolution | Resin, solvents | 90 to 120 |
| 2 | Neutralization | 100% Base to effect neutralization | 2 |
| 3 | Emulsification | 100% water to effect emulsion formation | 90 |
| 4 | Distillation | | |

In some embodiments, a time associated with the dissolving step of processes disclosed herein may be in a range of from about 20 minutes to about 40 minutes. One skilled in the art will appreciate that these figures are merely approximations and that numerous factors may provide for even shorter dissolution times, such as providing external heating and/or providing finer initial resin particles and/or controlling the polydispersity of the resin particles. In some embodiments, the dissolving step may be performed at elevated temperature. For example, an elevated temperature may be in a range from about 30° C. to about 200° C. Thus, in some embodiments, the dissolving step may be less than 20 minutes, including about 15 minutes, about 10 minutes, about 5 minutes, or about 1 minute, including any value in between and fractions thereof.

Correspondingly, the more water employed in step (1) of the present PIE process, the less time may be required to form the emulsion. In some embodiments, the time associated with the forming the emulsion step may be in a range of from about 50 minutes to about 70 minutes. Again, if more water is employed in step (1), the time may be less than about 50 minutes, including about 40 minutes, about 30 minutes, about 20 minutes, or about 10 minutes, including any value in between and fractions thereof. Again, application of heat or other operating conditions such as stirring speed and the like may affect the time required to complete formation of the emulsion.

In some embodiments, a cycle time of the entire phase inversion emulsification process may be reduced by about 1 to about 3 hours relative to a conventional phase inversion emulsification process. In some embodiments, the cycle time may be reduced by more than 3 hours, such as about 4 hours.

In some embodiments, there are provided phase inversion emulsification processes comprising dissolving at least one amorphous polyester resin in a mixture comprising (1) an organic solvent, (2) about one third of a total amount of neutralizing agent, and (3) a first portion of water, the first portion of water being insufficient to form an emulsion, neutralizing the dissolved at least one polyester resin with a second portion of neutralizing agent, wherein the second portion of neutralizing agent comprises the remaining amount of the total amount neutralizing agent, forming an emulsion by adding a second portion of water after the neutralizing step, and removing a portion of the organic solvent from the emulsion to provide a latex.

In some embodiments, processes disclosed herein may be integrated into larger process or system for the production of toner particles. In some such embodiments, processes disclosed herein may further include mixing with sufficient heating the latex formed in the PIE process with one or more of a pigment, a wax, an aggregating agent, and a charge control agent to provide aggregated particles.

In accordance with some embodiments, the following compositions are provided as guidance regarding the particular components that may be employed in the processes disclosed herein.

Resins

In some embodiments, the polyester resin comprises a first amorphous polyester. In some embodiments, the at polyester resin further comprises a second amorphous polyester. Two types of amorphous acidic polyester resins (low Mw FXC-42 and high Mw FXC-56, Kao Corporation, Japan) are commonly incorporated into Ultra-low-melt (ULM) toners, and these resins may account for about 75% to about 78% of the toner components. To make ULM toner, each resin is typically emulsified into an aqueous dispersion or emulsion (latex). Solvent-based phase inversion emulsification (PIE) processes disclosed herein can be employed to form the requisite polyester resin emulsions for making such toners.

In some embodiments, the first amorphous polyester and the second amorphous polyester may be present in a total amount in a range of from about 40% by weight to about 95% by weight of the latex.

In some embodiments, first amorphous polyester and second amorphous polyester are present in a ratio from about 0.1:0.9 to about 0.9:0.1, including any ratio in between.

In some embodiments, the polyester resin further comprises a crystalline polyester. In some embodiments, the crystalline polyester is present in an amount in a range of from about 1.0% by weight to about 35.0% by weight of the latex.

In some embodiments, the polyester resin comprises a crystalline resin, but not an amorphous resin.

Any resin may be utilized in forming a latex emulsion of the present disclosure. In embodiments, the resins may be an amorphous resin, a crystalline resin, and/or a combination thereof. In embodiments, the resin may be a crystalline polyester resin with acidic groups having an acid number of about 1 mg KOH/g polymer to about 200 mg KOH/g polymer, in embodiments from about 5 mg KOH/g polymer to about 50 mg KOH/g polymer. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylenesebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 85 percent by weight of the toner components, in embodiments from about 5 to about 50 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephtalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly (propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

wherein m may be from about 5 to about 1000. Examples of such resins and processes for their production include those disclosed in U.S. Pat. No. 6,063,827, the disclosure of which is hereby incorporated by reference in its entirety.

In embodiments, a suitable polyester resin may be an amorphous polyester based on any combination of propoxylated bisphenol A, ethoxylated bisphenol A, terephthalic acid, fumaric acid, and dodecenyl succinic anhydride. FXC-42, available from Kao Corporation, Japan, is an example of such an amorphous ester.

An example of a linear propoxylated bisphenol A fumarate resin which may be utilized as a latex resin is available under the trade name SPAMII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

(II)

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

An amorphous resin may be present, for example, in an amount of from about 5 to about 95 percent by weight of the toner components, in embodiments from about 30 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the amorphous resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Solvent

In some embodiments, processes disclosed herein may employ an organic solvent is selected from the group consisting of isopropanol, methyl ethyl ketone, methanol, ethanol, 1-butanol, 2-butanol, isobutanol, tert-butanol, and combinations thereof. In particular embodiments, pair of organic solvents may be employed, at least one of which may have appreciable miscibility in water. Any suitable organic solvent may be used to dissolve the resin, for example, alcohols, esters, ethers, ketones, amines, and combinations thereof, in an amount of, for example, from about 0.1% by weight to about 100% by weight of the resin, in embodiments of from about 2% by weight to about 50% by weight of the resin, in other embodiments of from about 5% by weight to about 35% by weight of the resin.

In embodiments, the solvent to resin ratio may be about 0.1:10 to about 20:10, in other embodiments, from about 1.0:10 to about 5:10.

In embodiments, suitable organic solvents, sometimes referred to, in embodiments, as phase inversion agents, include, for example, methanol, ethanol, propanol, isopropanol, 1-butanol, 2-butanol, tert-butanol, ethyl acetate, methyl ethyl ketone, and combinations thereof. In embodiments, the organic solvent may be isopropanol. In embodiments, the organic solvent may be immiscible in water and may have a boiling point of from about 30° C. to about 150° C.

Neutralizing Agent

In some embodiments, processes disclosed herein may employ a first portion of neutralizing agent and a second portion of neutralizing agent independently selected from the group consisting of ammonium hydroxide, potassium hydroxide, sodium hydroxide, sodium carbonate, sodium bicarbonate, lithium hydroxide, potassium carbonate, organoamines, and combinations thereof.

In embodiments, the resin may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic neutralizing agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

The basic neutralizing agent may be utilized in an amount of from about 0.001% by weight to 50% by weight of the resin, in embodiments from about 0.01% by weight to about 25% by weight of the resin, in embodiments from about 0.1% by weight to 5% by weight of the resin. In embodiments, the neutralizing agent may be added in the form of an aqueous solution. In other embodiments, the neutralizing agent may be added in the form of a solid.

Utilizing the above basic neutralizing agent in combination with a resin possessing acid groups, a neutralization ratio of from about 25% to about 500% may be achieved, in embodiments from about 50% to about 300%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure may optionally include adding a surfactant, before or during the dissolution, to the polyester resin. In embodiments, the surfactant may be added prior to dissolution of the polyester resin at an elevated temperature. Where utilized, a resin emulsion may include one, two, or more surfactants. The surfactants may be selected from ionic surfactants and nonionic surfactants. Anionic surfactants and cationic surfactants are encompassed by the term 2"ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in other embodiments, from about 1% to about 14% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

As noted above, the present process may employ more than one polyester resin. In some such embodiments, the resins may be all pre-blended together prior to processing. In some embodiments, one of a mixture resins may be a crystalline resin and elevated temperatures may be employed in the process which may be a temperature above the crystallization temperature of the crystalline resin. In further embodiments, the resin may be a mixture of amorphous and crystalline resins and the temperature employed for dissolution may be above the glass transition temperature of the mixture.

In some embodiments emulsifying neutralized polyester resins may comprise adding water into the solution of neutralized resin until phase inversion occurs to form a phase inversed latex emulsion. Emulsification may be followed by distilling the latex to remove from it organic solvent, water or a mixture of the two.

In embodiments, the neutralizing agent which may be utilized in the process of the present disclosure includes the agents mentioned hereinabove. In embodiments, an optional surfactant employed in the process may be any of the surfactants to ensure that proper resin neutralization occurs and leads to a high quality latex with low coarse content.

In embodiments, the surfactant may be added to the one or more ingredients of the resin composition before, during, or after any mixing. In embodiments, the surfactant may be added before, during, or after the addition of the neutralizing agent. In embodiments, the surfactant may be added prior to the addition of the neutralizing agent. In embodiments, a surfactant may be added to a pre-blend mixture prior to dissolution.

In embodiments, a continuous phase inversed emulsion may be formed. Phase inversion can be accomplished by continuing to add an aqueous alkaline solution or basic agent, optional surfactant and/or water compositions to create a phase inversed emulsion which includes a disperse phase including droplets possessing the molten ingredients of the resin composition, and a continuous phase including a surfactant and/or water composition.

Stirring, although not necessary, may be utilized to enhance formation of the latex. Any suitable stirring device may be utilized. In embodiments, the stirring may be at a speed of from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the mixture becomes more uniform, the stirring rate may be increased. In embodiments, a homogenizer (that is, a high shear device), may be utilized to form the phase inversed emulsion, but in other embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, any temperature of heating, the stirring speed, and the like, phase inversion may occur when the basic neutralization agent, optional surfactant, and/or water has been added so that the resulting resin is present in an amount from about 5% by weight to about 70% by weight of the emulsion, in embodiments from about 20% by weight to about 65% by weight of the emulsion, in other embodiments from about 30% by weight to about 60% by weight of the emulsion.

Following phase inversion, additional surfactant, water, and/or aqueous alkaline solution may optionally be added to dilute the phase inversed emulsion, although this is not required. Following phase inversion, the phase inversed emulsion may be cooled to room temperature if heat was employed, for example from about 20° C. to about 25° C.

In embodiments, distillation may be performed to provide resin emulsion particles as a latex with an average diameter size of, for example, from about 50 nm to about 500 nm, in embodiments from about 120 nm to about 250 nm. In some embodiments, the distillate may be optionally recycled for use in a subsequent phase inversion emulsification process.

In embodiments, for example, the distillate from the process of the present disclosure may contain methyl ethyl ketone (MEK), isopropanol (IPA) and water. In embodiments, the MEK-IPA-water mixture may be re-used for the next phase inversion batch. In some embodiments, solvents may be removed by a vacuum distillation.

The emulsified polyester resin particles in the aqueous medium may have a submicron size, for example of about 1 µm or less, in embodiments about 500 nm or less, such as from about 10 nm to about 500 nm, in embodiments from about 50 nm to about 400 nm, in other embodiments from about 100 nm to about 300 nm, in some embodiments about 200 nm. Adjustments in particle size can be made by modifying the ratio of solvent to resin, the neutralization ratio, solvent concentration, and solvent composition.

Particle size distribution of a latex of the present disclosure may be from about 30 nm to about 500 nm, in embodiments, from about 125 nm to about 400 nm.

The coarse content of the latex of the present disclosure may be from about 0.01% by weight to about 5% by weight, in embodiments, from about 0.1% by weight to about 3% by weight. The solids content of the latex of the present disclosure may be from about 10% by weight to about 50% by weight, in embodiments, from about 20% by weight to about 45% by weight.

The process of the present disclosure for the production of polyester emulsions using PIE may eliminate or minimize wasted product and produces particles with more efficient solvent stripping, solvent recovery, and permits recycling of the solvent.

The emulsions of the present disclosure may then be utilized to produce particles that are suitable for formation of toner particles.

Toner

Once the polyester resin has been converted into a latex and it may be utilized to form a toner by any process within the purview of those skilled in the art. The latex may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorant, wax, and other additives, may be added before, during or after mixing the resin to form the emulsion. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871 K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991 K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850:1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any process within the purview of one skilled in the art. Although embodiments relating to toner particle production are described below with respect to emulsion aggregation processes, any suitable process of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the polyester resins described above, optionally in surfactants, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature ($T_g$) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the shell resin latex is added.

Shell Resin

In embodiments, after aggregation, but prior to coalescence, a resin coating may be applied to the aggregated particles to form a shell thereover. In embodiments, the core may thus include a crystalline resin, as described above. Any resin described above may be utilized as the shell. In embodiments, a polyester amorphous resin latex as described above may be included in the shell. In embodiments, the polyester amorphous resin latex described above may be combined with a different resin, and then added to the particles as a resin coating to form a shell.

In embodiments, resins which may be utilized to form a shell include, but are not limited to, a crystalline resin latex described above, and/or the amorphous resins described above. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any process within the purview of those skilled in the art. In embodiments, the resins utilized to form the shell may be in an emulsion including any surfactant described above. The emulsion possessing the resins, optionally the crystalline polyester resin latex described above, may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

The shell may be present in an amount of from about 1 percent by weight to about 80 percent by weight of the latex particles, in embodiments of from about 10 percent by weight to about 40 percent by weight of the latex particles, in still further embodiments from about 20 percent by weight to about 35 percent by weight of the latex particles.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

In embodiments, the final size of the toner particles may be of from about 2 µm to about 12 µm, in embodiments of from about 3 µm to about 10 µm.

Coalescence

Following aggregation to the desired particle size and application of any optional shell, the particles may then be coalesced to the desired final shape, the coalescence being achieved by, for example, heating the mixture to a temperature of from about 45° C. to about 150° C., in embodiments from about 55° C. to about 99° C., which may be at or above the glass transition temperature of the resins utilized to form the toner particles, and/or reducing the stirring, for example to from about 20 rpm to about 1000 rpm, in embodiments from about 30 rpm to about 800 rpm. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling process may include introducing cold water to a jacket around the reactor. After cooling, the toner particles may be optionally washed with water, and then dried. Drying may be accomplished by any suitable process for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes a 2 L preparation of a low molecular weight amorphous polyester resin latex, in accordance with embodiments disclosed herein.

Figure 1:
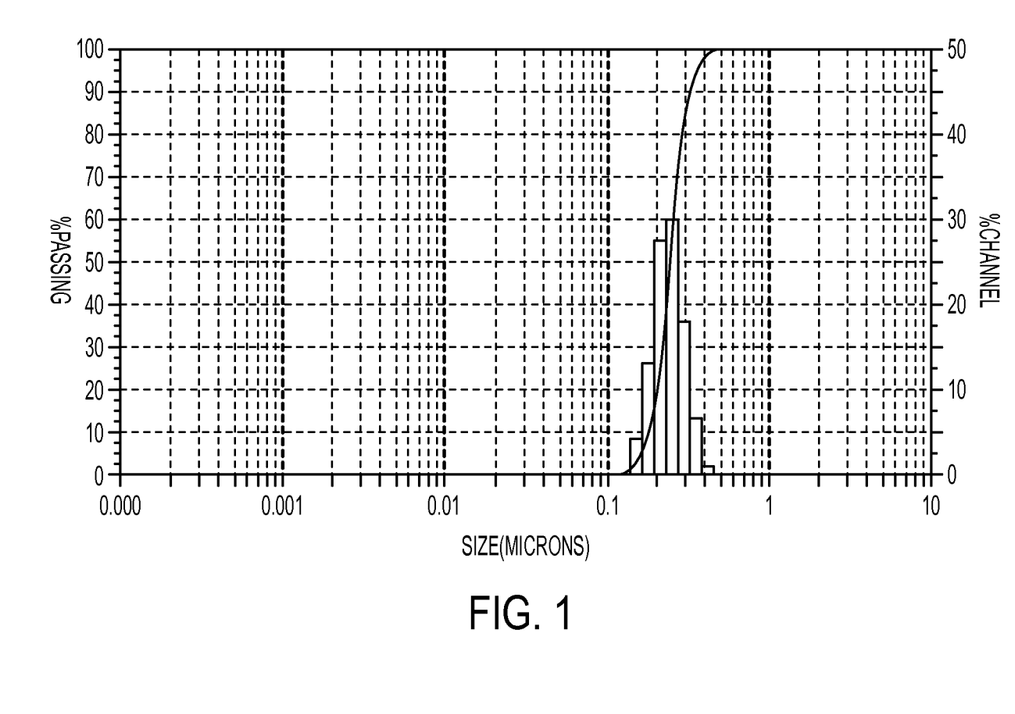
FIG. 1 shows a plot indicating the particle size distribution of particles produced by the phase inversion emulsification process described in Example 1.

A 2 L Buchi stainless steel reactor equipped with an anchor blade was used for phase inversion emulsification of a low molecular weight amorphous polyester resin (FXC-42 resin, available from Kao Corporation, Japan). The reactor was charged with 120 grams of methyl ethyl ketone (MEK), 20 grams of isopropanol (IPA), 100 grams of de-ionized water, 2.15 grams of previously prepared 10% ammonium hydroxide, and 200 grams of the polyester resin (acid value=10.7 mg KOH/g, $T_g$=59.4° C.). In this Example, the ratio of resin to MEK to IPA was 10:6:1. An anchor impeller equipped to the reactor was set to 350 rpm. The heating bath was started at a set point temperature of 45° C. 32 minutes (including the ramping time) later the resin was fully dissolved and at this time the reactor temperature reached 42° C. Subsequently the second portion of 4.25 grams of previously prepared 10% ammonium hydroxide was added into the resin solution within 2 minutes and the impeller mixing speed was reduced to 260 rpm. After holding 10 minutes, 300 grams of de-ionized water was metered into the reactor at a flow rate of 5.0 g/min over 60 minutes. A phase inversed latex had a particle size of 249.8 nm as measured using a Nanotrac particle size analyzer as indicated in FIG. 1. The latex containing the solvents was sieved with a 25 micron screen and 735 grams of latex was obtained and with a measured solid content of about 26.8%. In general, a batch yield over 98% without generation of latex fouling and coarse particles means that the resin is fully converted to the emulsion. The batch yield of in this Example was 98.5% indicating that the resin was fully dissolved in the process and nearly quantitatively converted to the dispersion of the polyester particles in water.

An alternative method to determine the degree of solubility of any given polyester resin in selected solvents is to examine the resin solution (containing solvent) under a microscope to identify a single clear phase with a uniform color.

Example 2

This example describes a 5 gallon preparation of a low molecular weight amorphous polyester resin latex, in accordance with Example 1.

The PIE process described in Example 1 was carried out on a 5 gallon scale. The existing reactor was used for phase inversion emulsification of FXC-42 resin.

For the purpose of comparison, a standard PIE process was also run to prepare FXC-42 latex on 5 gallon scale as a control. Thus, the process commenced by the complete dissolution FXC-42 resin first, followed by the neutralization of resin.

The latex samples were air dried and analyzed by gel permeation chromatography (GPC) and differential scanning calorimetry (DSC). These analyses provided the weight-average molecular weight (Mw), number-average molecular weight (Mn), and glass transition temperature ($T_g$) of the latexes produced at 5 gallon scale which are listed in Table 2, along with data for the raw resin.

TABLE 2

| 5 gallon PIE | Claimed PIE | Conventional PIE (control) | Raw Resin |
|---|---|---|---|
| Resin type | FXC-42 | FXC-42 | FXC-42 |
| pH value | 7.56 | 7.69 | / |
| Particle size (nm) | 218 | 255 | / |
| Mw (×1000) | 17.6 | 17.5 | 18.6 |
| Mn (×1000) | 3.6 | 3.3 | 4.6 |
| Polydispersity (PD) | 4.1 | 5.3 | 4.2 |
| $T_g$ (onset C, second scan) | 60.0 | 59.9 | 60.2 |

Figure 2:
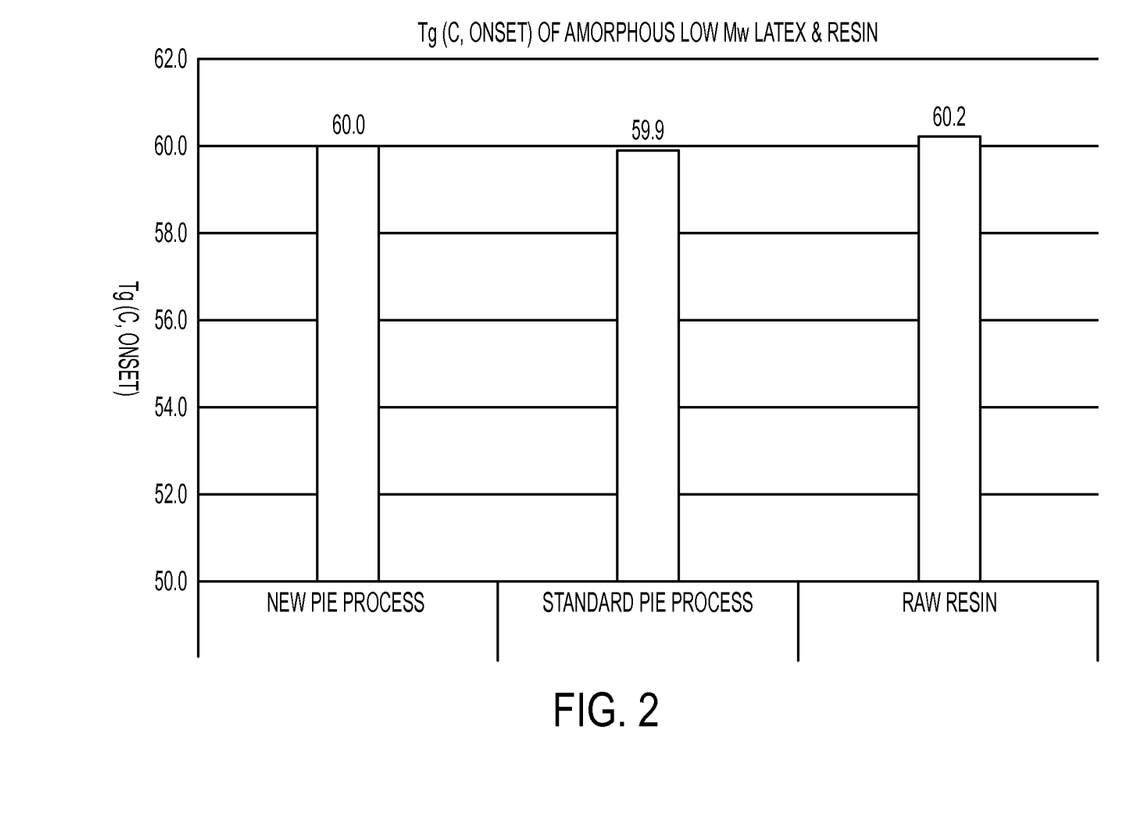
FIG. 2 shows a plot of glass transition temperatures ($T_g$) obtained from differential scanning calorimetry (DSC) data for an exemplary polyester latex prepared by (1) the PIE process, in accordance with embodiments disclosed herein, and a comparison with a latex prepared by (2) the standard PIE process and (3) the raw polyester resin.
Figure 3:
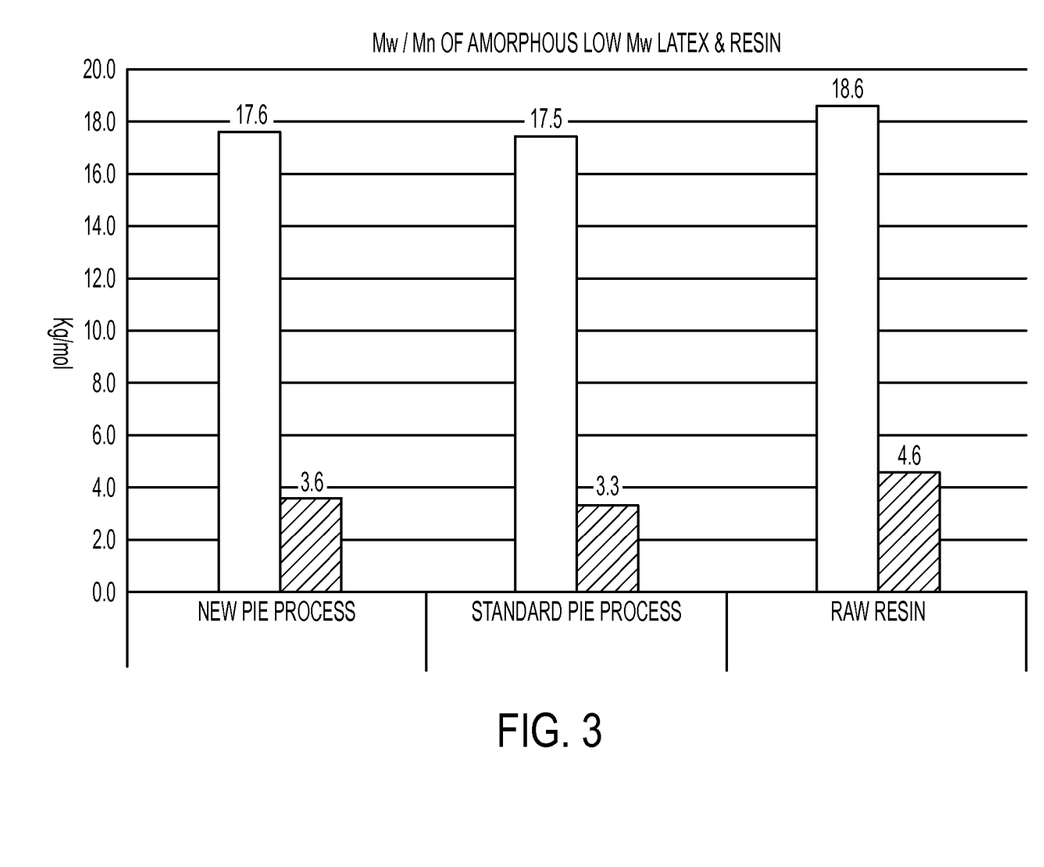
FIG. 3 shows gel permeation chromatography (GPC) data for an exemplary polyester latex prepared by (1) the PIE process, in accordance with embodiments disclosed herein, and a comparison with a latex prepared by (2) the standard PIE process and (3) the raw polyester resin.

Analytical results of the two latexes prepared by PIE process disclosed herein and the conventional PIE process indicated no negative impact on the latex prepared in accordance with embodiments disclosed herein. The sample prepared with the new PIE formulation indicated similar properties as the control sample prepared by the standard PIE process, and also comparable to the properties of the raw resin. The data is also provided in graphical form in FIG. 2 and FIG. 3. In the scaled up process, an average particle size of about 218 nm was obtained by the new PIE process compared to about 255 nm by the conventional PIE process. The new PIE process significantly decreased the production cycle time by about 1.5 to about 2.0 hours.

What is claimed is:

1. A phase inversion emulsification process comprising: dissolving a polyester resin in a mixture comprising (1) an organic solvent, (2) a first portion of a total amount of neutralizing agent, and (3) a first portion of water, wherein a time associated with the dissolving step is in a range from about 20 minutes to about 40 minutes;

neutralizing the dissolved polyester resin with a second portion of neutralizing agent, wherein the second portion of neutralizing agent comprises the remaining amount of the total amount of neutralizing agent;

forming an emulsion by adding a second portion of water after the neutralizing step, wherein a time associated with forming the emulsion step is about 50 minutes to about 70 minutes; and removing a portion of the organic solvent from the emulsion to provide a latex.

2. The process of claim 1, wherein a cycle time of the phase inversion emulsification process is reduced by about 1 to about 3 hours relative to a phase inversion emulsification process that does not employ partial neutralization.

3. The process of claim 1, wherein the polyester resin comprises a first amorphous polyester.

4. The process of claim 3, wherein the polyester resin further comprises second amorphous polyester.

5. The process of claim 4, wherein the first amorphous polyester and second amorphous polyester are present in a total amount in a range of from about 40 percent by weight to about 95 percent by weight of the latex.

6. The process of claim 4, wherein the first amorphous polyester and second amorphous polyester are present in a ratio from about 0.1:0.9 to about 0.9:0.1.

7. The process of claim 4, wherein the polyester resin further comprises a crystalline polyester.

8. The process of claim 7, wherein the crystalline polyester is present in an amount in a range of from about 1.0 percent by weight to about 35.0 percent by weight of the latex.

9. The process of claim 1, wherein the polyester resin comprises a crystalline resin.

10. The process of claim 1, wherein the organic solvent is selected from the group consisting of isopropanol, methyl ethyl ketone, methanol, ethanol, 1-butanol, 2-butanol, isobutanol, tert-butanol, and combinations thereof.

11. The process of claim 1, wherein the first portion of neutralizing agent and second portion of neutralizing agent are independently selected from the group consisting of ammonium hydroxide, potassium hydroxide, sodium hydroxide, sodium carbonate, sodium bicarbonate, lithium hydroxide, potassium carbonate, organoamines, and combinations thereof.

12. The process of claim 1, wherein the first portion of neutralizing agent is dissolved in the first portion of water.

13. The process of claim 1, wherein the first portion of neutralizing agent comprises about one third of the total amount of neutralizing agent.

14. The process of claim 1, wherein the first portion of water comprises about one fourth to about one third of a total amount of water required to form an emulsion.

15. The process of claim 1, wherein the dissolving step is performed at elevated temperature.

16. A phase inversion emulsification process comprising: dissolving an amorphous polyester resin in a mixture comprising (1) an organic solvent, (2) about one third of a total amount of a total amount of neutralizing agent, and (3) a first portion of water, the first portion of water being insufficient to form an emulsion wherein a time associated with the dissolving step is in a range from about 20 minutes to about 40 minutes;

neutralizing the dissolved polyester resin with a second portion of neutralizing agent, wherein the second portion of neutralizing agent comprises the remaining amount of the total amount of neutralizing agent;

forming an emulsion by adding a second portion of water after the neutralizing step, wherein a time associated with forming the emulsion step is about 50 minutes to about 70 minutes; and     removing a portion of the organic solvent from the emulsion to provide a latex.

17. The process of claim 16, further comprising mixing with sufficient heating the latex and one or more of a pigment, a wax, an aggregating agent, and a charge control agent to provide aggregated particles.

18. The process of claim 17, further comprising adding a second latex to the aggregated particles and heating to form a toner particle comprising a shell of the second latex.

\* \* \* \* \*